US012562890B2

(12) United States Patent
Scheible et al.

(10) Patent No.: US 12,562,890 B2
(45) Date of Patent: Feb. 24, 2026

(54) METHOD FOR EXCHANGING CRYPTOGRAPHIC KEYS BETWEEN COMMUNICATION SUBSCRIBERS

(71) Applicant: Robert Bosch GmbH, Stuttgart (DE)

(72) Inventors: Patrik Scheible, Stuttgart (DE); Sebastian Paul, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 309 days.

(21) Appl. No.: 18/178,823

(22) Filed: Mar. 6, 2023

(65) Prior Publication Data

US 2023/0336334 A1 Oct. 19, 2023

(30) Foreign Application Priority Data

Apr. 13, 2022 (DE) ..................... 10 2022 203 725.1

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/0852* (2013.01); *H04L 9/3242* (2013.01)

(58) Field of Classification Search
CPC ..... H04L 9/085; H04L 9/0825; H04L 9/0852; H04L 9/3242
USPC ....................................................... 713/171
See application file for complete search history.

(56) References Cited

U.S. PATENT DOCUMENTS

2022/0006835 A1 1/2022 Gray et al.
2024/0106636 A1* 3/2024 Nix ........................ H04L 9/0825

FOREIGN PATENT DOCUMENTS

| CN | 108111301 A | 6/2018 | |
| DE | 102020200726 A1 | 7/2021 | |
| EP | 4221070 A1 * | 8/2023 | ............. H04L 63/18 |
| EP | 4465588 A1 * | 11/2024 | ........... H04L 9/0643 |
| WO | 2022067132 A1 | 3/2022 | |

* cited by examiner

*Primary Examiner* — Linglan Edwards
*Assistant Examiner* — Phuc Pham
(74) *Attorney, Agent, or Firm* — NORTON ROSE FULBRIGHT US LLP

(57) ABSTRACT

A method, in a server, for exchanging cryptographic keys for quantum-secure communication between the server and a client. The method includes: receiving a request message for a secure communication channel from a client, including at least one quantum-secure public ephemeral key and a first secret text; decapsulating the first secret text with a decapsulation function using a quantum-secure secret static key of the server, including generating a first secret; encapsulating the quantum-secure public ephemeral key with an encapsulation function including generating a second secret text and a second shared secret; encapsulating a quantum-secure public static key of the client using the encapsulation function, including generating a third secret text and a third shared secret; generating symmetric keys using at least the first, second, and third secrets; and sending a response message to the client, including the second and third secret texts.

17 Claims, 2 Drawing Sheets

METHOD FOR EXCHANGING CRYPTOGRAPHIC KEYS BETWEEN COMMUNICATION SUBSCRIBERS

CROSS REFERENCE

The present application claims the benefit under 35 U.S.C. § 119 of German Patent Application No. DE 10 2022 203 725.1 filed on Apr. 13, 2022, which is expressly incorporated herein by reference in its entirety.

FIELD

The present invention relates to a method for exchanging cryptographic keys between a client and a server, and to a computing unit and a computer program for carrying out the same.

BACKGROUND INFORMATION

Common cryptographic applications and protocols utilize asymmetric cryptographic primitives to generate a shared secret (ss), and symmetric cryptographic primitives to use the generated shared secret during data transport. In general, security through cryptographic primitives is based on the complexity (e.g., processing time required) of the algorithms used with current computer architectures. For example, the widely used RSA method utilizes the factorization of large numbers, which is laborious to calculate; elliptic-curve cryptography (ECC) is based on the problem of calculating discrete logarithms in a group of points of an elliptic curve, for which a fast algorithm is also not known.

However, once sufficiently powerful quantum computers are available, these problems can be solved in polynomial time based on Shor's algorithm. An attacker who listens to and saves communications encrypted in this way could, therefore, decrypt the intercepted information using quantum computers, which is also known as a store-now-decrypt-later attack. Thus, these methods no longer provide reliable security based on their complexity and must be replaced or extended by new, quantum-secure methods (post-quantum cryptography, PQC). Such methods are also referred to as PQ-secure. A variety of possible alternatives are currently being developed, which may be used in future standards.

This problem relates to a wide range of cryptographic applications. One example is systems based on the OPC UA (Open Platform Communications Unified Architecture) standard, which is utilized in particular in the industrial sector for communication between end devices, such as machines, robots, vehicles, and corresponding central locations (machine-to-machine). In the future, OPC UA may, for example, also play a role in the communication of end devices in connection with the Internet of Things (IoT) as well as the general networking of devices in all areas. Details of the OPC UA standard can, for example, be found in the multi-part standard specification "OPC Unified Architecture Specification" of the OPC Foundation, Part 1 to Part 14, retrievable at https://opcfoundation.org/developer-tools/specifications-unified-architecture.

A basic characteristic of OPC UA is the possibility of providing secure communication channels between two subscribers, in particular between a client and a server. In this case, a handshake method for initializing a secure communication channel between the subscribers is provided. The method is based on the client generating a nonce, which is transmitted to the server encrypted and signed. The server forms a further nonce, which is used together with the client nonce to form symmetric session keys by forming the nonces as input values of a pseudo-random function. The server subsequently sends a response, which inter alia comprises the server nonce, back to the client. With the available nonces, the client can thus also comprise the same symmetric session keys, which are then used for the further messages in the secured channel for encryption and signing.

An attacker who intercepts the messages described above during an OpenSecureChannel handshake (request and response) could decrypt these messages upon access to a sufficiently powerful quantum computer and would thus have all the necessary information to also decrypt any subsequent messages of a session. The security procedure formed in this way in the OPC UA standard is thus not yet quantum-secure.

German Patent Application No. DE 10 2020 200 726 A1 describes a method that enables quantum-secure communication through hybrid key exchange and is thus protected against store-now-decrypt-later attacks. However, this method cannot be used to also enable quantum-secure authentication between the communication subscribers and only provides conventional authentication based on conventional signature methods.

SUMMARY

The present invention provides methods for exchanging cryptographic keys for quantum-secure communication for a server and for a client, as well as a computing unit and a computer program for carrying out the same. Advantageous example embodiments of the present invention are disclosed herein.

The present invention provides an improved security mechanism for initializing secure communication between two subscribers and for quantum-secure authentication, in particular for the OPC UA standard.

Specifically provided according an example embodiment of the present invention is a method, in a server, in which a request message for a secure communication channel is received from a client, wherein the request message comprises at least one quantum-secure public ephemeral key and a first secret text. In this case, the quantum-secure public ephemeral key is part of an asymmetric ephemeral key pair formed by means of a key generation function of a quantum-secure key encapsulation mechanism. The first secret text is then decapsulated with a decapsulation function of the quantum-secure key encapsulation mechanism using a quantum-secure secret static key of the server, wherein the decapsulation generates a first secret. The quantum-secure public ephemeral key is encapsulated with an encapsulation function of the quantum-secure key encapsulation mechanism, wherein the encapsulation generates a second secret text and a second shared secret. In addition, a quantum-secure public static key of the client is encapsulated using the encapsulation function of the quantum-secure key encapsulation mechanism, wherein the encapsulation generates a third secret text and a third shared secret. Symmetric keys are then generated using at least the first secret, the second secret and the third secret. In addition, a response message containing at least the second secret text and the third secret text is sent to the client.

A cryptographic key is termed ephemeral if it is newly generated for each execution of a key exchange process.

Additionally, according to an example embodiment of the present invention, it is possible for a MAC code to be formed by applying a MAC function to a predetermined content of the response message using a key from the generated hybrid symmetric keys, wherein the response message additionally comprises the formed MAC code.

Likewise, according to an example embodiment of the present invention, it is possible for a MAC code to be obtained in the request message from the client. Then, a local MAC code can be formed as a key over a predetermined content of the request message using the decapsulated first secret, and the formed local MAC code can be compared to the obtained MAC code in order to verify the obtained MAC code.

The method according to the present invention can be implemented in some embodiments such that the request message further comprises a first nonce and that the server generates a second nonce. When generating the hybrid symmetric keys, the first nonce and the second nonce can then additionally be used, and the response message to the client additionally also comprises the second nonce.

Moreover, according to an example embodiment of the present invention, a method in a client is provided, in which an asymmetric quantum-secure ephemeral key pair with a quantum-secure public ephemeral key and a quantum-secure secret ephemeral key is first generated by means of a key generation function of a quantum-secure key encapsulation mechanism. The quantum-secure public ephemeral key is encapsulated with an encapsulation function of the quantum-secure key encapsulation mechanism, wherein the encapsulation generates a first secret text and a first shared secret. A request message is subsequently transmitted to the server, wherein the request message comprises at least the quantum-secure public ephemeral key and the first secret text. In response, a response message comprising at least a second secret text and a third secret text is received from the server. The received second secret text is decapsulated with a decapsulation function of the quantum-secure key encapsulation mechanism using the secret quantum-secure ephemeral key, wherein the decapsulation yields a shared second secret. In addition, the received third secret text is decapsulated with a decapsulation function of the quantum-secure key encapsulation mechanism using a secret quantum-secure static key of the client, wherein the decapsulation yields a third shared secret. Symmetric keys are then generated using the first secret, the second secret and the third secret.

Additionally, according to an example embodiment of the present invention, the method in the client may comprise forming a MAC code by applying a MAC function to a predetermined content of the request message using the first secret as a key, wherein the request message to the server additionally comprises the formed MAC code.

In addition, it is possible that a MAC code for the response message is obtained in the response message from the server. Then, a local MAC code is formed over a predetermined content of the response message using a predetermined key from the generated hybrid symmetric keys, and the formed local MAC code is subsequently compared to the obtained MAC code in order to verify the obtained MAC code.

In some embodiments of the present invention, the method may further comprise the client generating a first nonce, wherein the request message to the client additionally comprises the first nonce. The response message from the server may then additionally comprise a second nonce, wherein when the client generates the hybrid symmetric keys, the first nonce and the second nonce are additionally used.

In this case, generating the keys on both the client side and the server side can additionally comprise generating a third and a fourth nonce using the first secret, the second secret and the third secret, wherein the symmetric keys can be generated from the first nonce, the second nonce, the third nonce and the fourth nonce using a combiner. For example, an XOR combiner or an XOR-then-MAC combiner may be utilized as a combiner.

The use of additional nonces is in accordance with the OPC-UA standard, which can thus, as an example, be fully adopted and extended. However, these procedures may also be implemented in other standards or non-standard communications.

In particular, according to an example embodiment of the present invention, the response message may form a modified response message for an OpenSecureChannel handshake in an OPC UA protocol, and the request message may form a modified request message for an OpenSecureChannel handshake in an OPC UA protocol. This provides a possibility of fully supporting the existing OPC UA standard and still providing quantum-secure communication and thus security against post-quantum attacks through the extension.

The server and the client use the same quantum-secure key encapsulation mechanism and the same combiner.

In particular, the method described above may be used to form symmetric session keys for encrypting and/or signing messages in a subsequent secure communication session between the server and the client. For example, two key pairs for signature and encryption may be formed. However, other key variants are likewise possible. In this way, quantum-secure authentication along with a key exchange can be achieved in one handshake. Applying quantum-secure signature schemes is thus no longer required for authentication; instead, simple conventional signature and encryption methods may be applied. The use of the key encapsulation mechanisms instead of, for example, quantum-secure signature methods can thus reduce the communication effort and the duration of the handshake. Since the keys for a quantum-secure key encapsulation mechanism are significantly shorter than the keys for a quantum-secure signature scheme, the size of the hybrid client certificate or server certificate containing these keys is thus also significantly reduced.

A computing unit according to an example embodiment of the present invention, e.g., a processor of a PC, a microcontroller, a control unit of an automation system, etc., is configured, in particular in terms of program technology, to carry out a method according to the present invention.

Since the OPC UA standard is in particular also aimed at end devices with limited resources, e.g., so-called embedded devices, a secure method can thus also be implemented for these devices, especially in the industrial environment, without massively increasing the necessary resource requirements (e.g., computing time, transfer speed). Proven, conventional security mechanisms that, in the hybrid combination, still offer security against future attacks are thus utilized.

The implementation of a method according to the present invention in the form of a computer program or computer program product with program code for carrying out all method steps is also advantageous since this results in particularly low costs, in particular if an executing control unit is also utilized for further tasks and is therefore present in any event. A machine-readable storage medium is also provided according to the present invention, on which the computer program is stored as described above. Suitable storage media or data carriers for providing the computer program are in particular magnetic, optical and electrical memories, such as hard disks, flash memory, EEPROMS, DVDs, etc. Downloading a program via computer networks (internet, intranet, etc.) is possible as well. Such a download can be wired or cabled or wireless (e.g., via a WLAN, a 3G, 4G, 5G or 6G connection, etc.).

Further advantages and embodiments of the present invention will emerge from the description herein and the figures.

The present invention is illustrated schematically in the figures based on embodiment examples and is described in detail in the following with reference to the figures.

DETAILED DESCRIPTION OF EXAMPLE EMBODIMENTS

Figure 1:
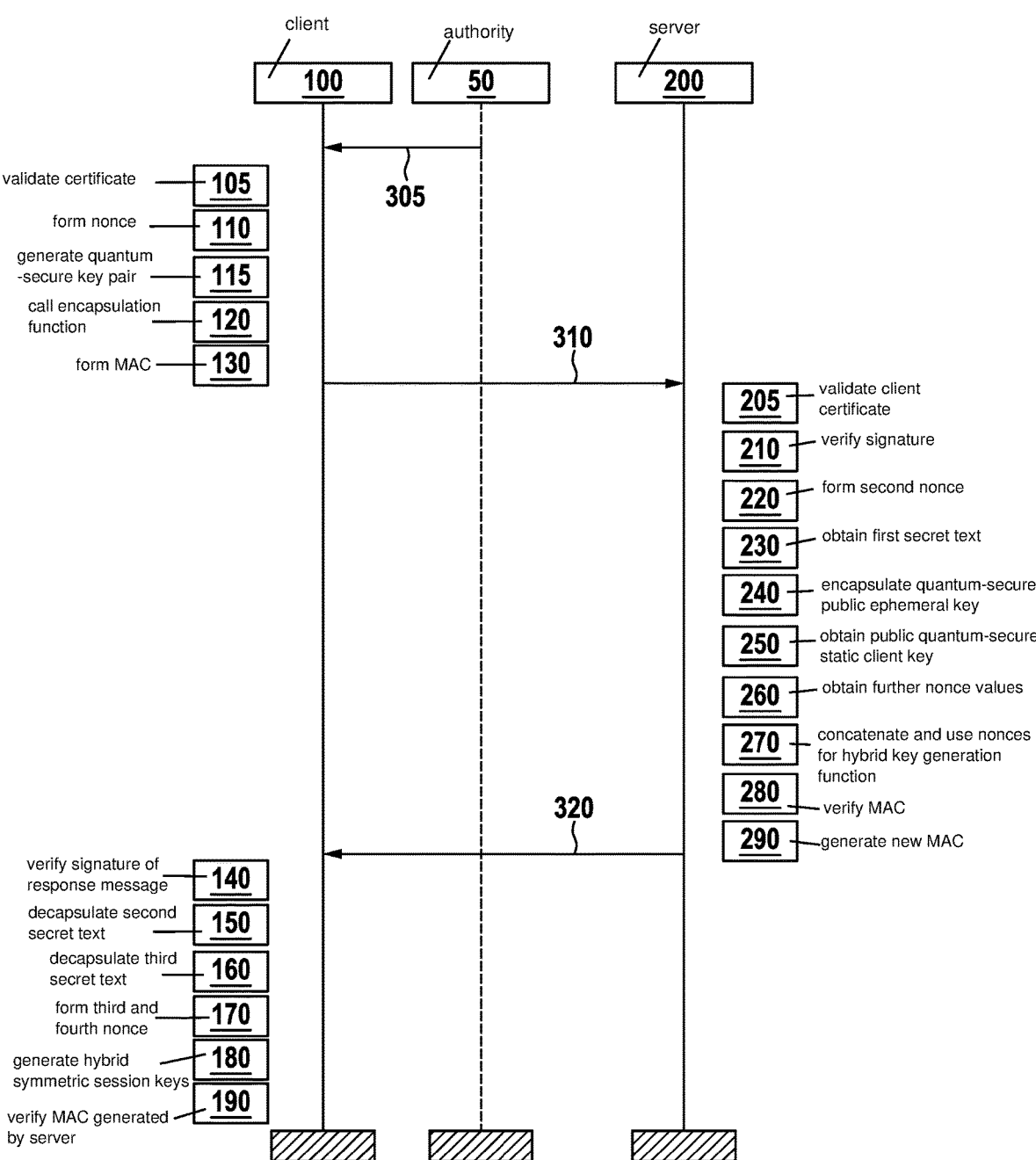
FIG. 1 shows a sequence diagram for a handshake with hybrid key exchange for a modified OPC UA protocol according to an exemplary embodiment of the present invention.

The method steps and features described below may in principle be used in any communication method that enables exchange of the respective messages and can carry out the respective mechanisms, such as key generation and key encapsulation. As an example, communication according to the OPC UA (Open Platform Communications Unified Architecture) standard is described below.

A basic characteristic of OPC UA is the possibility of providing secure communication channels between two subscribers, in particular between a client and a server. In this case, a handshake method for initializing a secure communication channel between the subscribers is provided.

The method is based on the client generating a so-called OpenSecureChannel request, which inter alia comprises a client nonce in the form of a cryptographically secure random number and a validated client certificate. The OpenSecureChannel request message is then encrypted using a public key of the server and signed using a private key of the client. The signed and encrypted message thus generated is sent from the client to the server.

The certificate is located in the header and can therefore be validated by the server without decrypting the message. If the certificate is successfully validated, the server subsequently decrypts the message and checks it for authenticity. The server subsequently generates a cryptographic random number as a server nonce. For signing and encrypting further messages in the secure channel, symmetric keys are then generated based on the server and client nonces by using them as input values of a pseudo-random function (PRF).

The server subsequently sends a response, which inter alia contains the server nonce, back to the client.

The exchanged handshake messages may contain further elements, for example a lifetime for a security token, which indicates after what time the secured channel must be reinitialized through a further request message.

The actual messages in the secured channel are then encrypted and signed by the symmetric session keys that were generated identically both in the server and in the client based on the previous initialization and the exchange of the asymmetric keys. The symmetric session keys may be periodically refreshed at defined time intervals.

In order to protect a system, such as an OPC UA system with limited resources, against potential attacks using a quantum computer, it is proposed here to use hybrid methods for the key exchange so that the combined key exchange remains secure overall as long as one of the two methods used remains secure. In this respect, the security protocol of an OPC UA system can be used as a basis and a hybrid key exchange method can be integrated.

In particular, a key encapsulation mechanism (KEM) may be used for this purpose. According to the present invention, methods of such key encapsulations are also used in a scheme for indirect authentication. A quantum-secure signature scheme can thus be omitted. Security against post-quantum attacks is achieved by encapsulating quantum-secure keys provided in hybrid certificates.

Each key encapsulation mechanism may comprise the three following functions:

1. The generation of a key pair consisting of a public key and a secret key.
2. The encapsulation, wherein a random shared secret is generated, which is then encrypted using the public key so that an encrypted secret text is obtained.
3. The decapsulation function or removal of the encapsulation, wherein the shared secret is again obtained by decrypting the secret text using the secret key.

In order to integrate an encapsulation mechanism into a communication protocol, it must be converted into a key exchange algorithm.

A quantum-secure key pair can be generated using the key generation function of a quantum-secure key encapsulation mechanism KEM. In this case, any quantum-secure key encapsulation mechanism may be used; the exemplary embodiments described herein are not dependent on the choice of the mechanism.

Moreover, signature schemes may be used, which may comprise the following steps (for both conventional and quantum-secure schemes):

1. The generation of a key pair, again consisting of a public key and a secret key, for signing.
2. The generation of a signature, wherein a signature for the message m is generated using the secret key.
3. The verification or validation of the signature by another subscriber, wherein this function uses the message m, the signature and the public key of the key pair as input. This verification function results in "true" or "false" depending on whether the signature could successfully be verified or not.

In a hybrid key exchange, so-called combiners are utilized for two key encapsulation mechanisms, or key generation mechanisms, by means of which two shared secrets generated separately by the respective KEM are combined into a single set of shared secret keys. In the embodiments described herein, various combiners are utilized by way of example, wherein, in one embodiment, an XOR-then-MAC combiner may be used, and as an alternative, for example, a cryptographically secure hash function may be used to combine the symmetric keys. In general, any suitable combiners may be used.

FIG. 1 shows a sequence diagram of a handshake with a hybrid key exchange and hybrid authentication schemes for a modified OPC UA protocol according to an exemplary embodiment. In this case, the conventional structure for initializing a secure channel and for authenticating the subscribers using the OpenSecureChannel handshake method and the messages used as a basis can be retained but extended by a hybrid scheme. In particular, preferably all steps and message elements of the previous standard handshake can be retained.

The left side of FIG. 1 shows the exemplary method steps on the side of a first subscriber or client 100, which sends the request message for establishing a secure channel, while the right side shows a second subscriber or server 200, which processes information obtained and sends a corresponding response to the client 100. In addition, an authority 50, e.g., a so-called discovery endpoint, is shown, which can provide the required certificates. The arrows shown between the subscribers 50, 100, 200 respectively represent data transfer in the indicated direction.

It is understood that the terms "client" and "server" are used only to describe the roles performed in this handshake method and do not limit the respective communication subscriber or end device. In particular, depending on the embodiment, an end device may also perform both roles in different connections or services.

The client 100 may obtain, from the authority 50, a message 305 containing at least one hybrid certificate. The certificate is to comprise at least one certificate for a quantum-secure static public key of the communication partner, in this case the server; in particular, a certificate chain may be transmitted here.

In a first step 105, the obtained certificate 305 may be validated. The validation of the certificate may also be performed by the client 100 by, for example, incorporating a trusted authentication authority not shown here.

The client can then form a first nonce in step 110, for example by generating a cryptographically secure random number. Alternatively, here as well, a client nonce may first be formed as a random number, which is then encapsulated with a conventional server key from the hybrid server certificate. The encapsulation yields a secret text, which can be used analogously to the first nonce.

In addition, in step 115, a quantum-secure key pair can be generated from a public and a secret key using the key generation function of a quantum-secure key encapsulation mechanism KEM. This key pair can thus be used for the subsequent encapsulation and decapsulation and is preferably an ephemeral quantum-secure key pair that is used only for this encapsulation.

In step 120, the encapsulation function of the quantum-secure key encapsulation mechanism used can be called. In so doing, the client can encapsulate the server's quantum-secure static public key obtained through the server certificate, by generating a random shared first secret and encrypting this first secret with the server's public static key so that a first quantum-secure secret text is formed.

In the next step 130, a message authentication code (MAC) can be formed, wherein a common MAC algorithm may be applied here. The basic mode of operation of a MAC function in which an authentication code in the form of a checksum is formed from two input values, namely the message to be protected as well as a secret key, is described in the related art and is not explained further here. It is understood that, therefore, in the following examples, the MAC codes can in each case be formed over at least a portion of the request and response messages that are transmitted and to be protected, or over the entire message content. The respectively other subscriber should in this case know to which message portions the MAC code relates, so that said subscriber is able to carry out the verification of the MAC code.

A concatenation of the first nonce and the generated first secret text can be used as the input value or message to be protected for the MAC function, and the generated first secret can be used as the key for the MAC function.

The client can now form a request message 310 from the formed elements. In particular, this may, by way of example, be a request message for initializing a secure channel on the side of a first subscriber, i.e., the client here, as an extension of the usual OpenSecureChannel request in the OPC UA standard. In this case, the components of the traditional OpenSecureChannel request can be adopted and extended by further elements.

The request message 310 sent to the server 200 can, in particular, comprise the ephemeral public key generated in step 115, as well as the first secret text from the encapsulation of the server key in step 120. In addition, the formed message authentication code from step 130 as well as the first nonce from step 110 may be inserted into the message. The message may further comprise a hybrid certificate of the client that comprises at least one quantum-secure public static key of the client for a quantum-secure encapsulation mechanism.

Additionally, as provided for in the OPC UA standard, a thumbprint (fingerprint) of the certificate may be contained in the message.

For simplification, the quantum-secure public ephemeral key, the MAC code as well as the first secret text can also be accommodated in the message header (e.g., in the security header) instead of in the message text, since this avoids computationally complex asymmetric encryption. As in the traditional handshake method, the request message thus formed may then be encrypted and signed and the signature formed appended to the message. A conventional encryption and signature scheme, such as RSA, can in particular be used for this purpose. A quantum-secure signature scheme is not required. For encryption, a conventional public server key that may be contained in the hybrid server certificate may, for example, be utilized, and the encrypted request message may subsequently be signed with a conventional secret client key. An example of the applied certificate chain is described in more detail below.

The server 200 receives the above-described request message 310 from the client. First, in step 205, the server may validate the client certificate in a customary manner, e.g., via a trusted authentication authority not shown here. If the certificate verification is successful, the signature of the request message can be verified in step 210 using the public client key from the hybrid certificate.

In step 220, a second nonce can now be formed, which may again be a (conventional) cryptographically secure random number. As already on the client side, the second nonce may alternatively also be formed here by encapsulating a cryptographically secure random number with the conventional key and using the obtained secret text as the second nonce.

In step 230, the first secret text obtained as part of the request message may be decapsulated using a decapsulation function of the quantum-secure key encapsulation mechanism KEM with the quantum-secure secret static key of the server. As a result, the first shared secret that the client generated in step 120 is obtained.

In addition, two further keys are now encapsulated by the server using the encapsulation function of the quantum-secure key encapsulation mechanism used. In step 240, the quantum-secure public ephemeral key from the request message 310 can be encapsulated by applying this key to a random second secret so that a second secret text is obtained. In step 250, the public quantum-secure static client key obtained in the client certificate can be encapsulated by applying this key to a random third secret so that a third secret text is obtained.

Since, for generating various cryptographic keys, the predetermined OPC UA handshake requires nonces on the server and client sides, an additional pseudo-random function (PRF) can be used in the present example in step 260 to obtain further nonce values from the three shared secrets formed in steps 120 (on the client side), 240 and 250 (on the server side). The first secret, the second secret and the third secret as well as a suitable "salt" can thus be used as input values for the pseudo-random function PRF. Only as an example, a value formed from the received quantum-secure ephemeral public key, static server information and static client information may be used as salt here. Two further random secrets, for example of 32 bytes each, corresponding to two further nonces as third and fourth nonces are then generated as output value. For example, the pseudo-random functions applied may internally use hash functions, such as SHA-256 or the like, that have sufficient length (in this case 256 bits) in order to provide security against quantum computer attacks. These functions are iterated as often as necessary to reach the necessary length of the keys or nonces. However, other requirements for the generation of the further nonces may in principle also be provided.

All nonces, i.e., the first nonce from step 110 on the client side, the second nonce from step 220, as well as the third and the fourth nonce from step 260, can then be concatenated in step 270 and used as an input value for a hybrid key generation function provided for forming the symmetric session keys. This may be achieved in an exemplary embodiment by extending the nonces by pseudo-random functions PRFs and then applying an exclusive OR (XOR) to the respective preliminary keys generated therewith. This ultimately generates hybrid symmetric keys. After successfully completing the handshake, these hybrid symmetric session keys can be used to encrypt and sign the subsequent messages of a session on both sides. For example, for the client and the server, a key for encrypting and a key for signing may in each case be created so that four symmetric keys are generated. In addition, initialization vectors may also be generated for each subscriber.

After the symmetric session keys have been generated, the MAC code from the request message of the client may first be verified in step 280. Then, in step 290, a new message authentication code may again be generated by the server by applying the MAC function to the concatenation of the second nonce and the two secret texts generated by the encapsulations in steps 240 and 250. One of the generated symmetric session keys, e.g., the generated signature key of the server, may be used as the key for the MAC function.

The processing of the request message can now be completed by forming a corresponding response message 320 and sending it to the client. As with the request message, this response message may be formed as an extension of the traditional OpenSecureChannel response message in the OPC UA standard so that the components of the traditional response message are adopted and additional fields are used as described below.

This response message 320 may comprise the second nonce, the second and third secret texts generated in the encapsulations, and the message authentication code MAC formed by the server. At least the MAC code as well as the third secret text may also be accommodated in the header of the message. In addition, as provided in the OPC-UA standard, the response message may again contain the hybrid server certificate along with a thumbprint of the certificate. The message may then be encrypted again in a conventional manner using the public signature key of the client and signed using the secret signature key of the server so that an encrypted response message with corresponding signature is obtained, which can then be transmitted to the client. Here too, a conventional signature scheme, such as RSA, is used.

On the side of the client, the response message 320 is received and further processed. In step 140, the signature of the response message can be verified using the public server key.

Then, in steps 150 and 160, the obtained secret texts may be decapsulated by applying the decapsulation function of the key encapsulation mechanism used. In step 150, the second secret text may be decapsulated using the secret ephemeral key formed in step 115, so that the second shared secret is obtained. Likewise, in step 160, the third secret text may be decapsulated using the secret quantum-secure static client key, so that the third secret is obtained. In steps 170 and 180, the same hybrid key generation steps are carried out as on the server side in steps 260 and 270, so that these steps are not described in detail again here. In step 170, the third and the fourth nonce are thus formed from the three available shared secrets and in step 180, using a combiner, the hybrid symmetric session keys are generated from the four nonces. Thus, both subscribers are now in possession of the same hybrid symmetric session keys, which can then be used for further communication.

Finally, since the required key is now available, the message authentication code MAC1 generated by the server in step 290 can be verified in step 190.

Only by way of example, a possible embodiment of the combiner for generating the hybrid session keys, which takes place in steps 180 on the client side and 270 on the server side, is explained below. However, other hybrid combiners, and thus other key generation functions, can also be used in connection with the embodiments described herein. The associated algorithm is shown below.

```
1:    procedure GENERATEKEYS(nonces, policy)
2:        (len_sigkey, len_enckey, len_IV) ← GETLENGTHKEYS(policy)
3:        len_keys ← len_sigKey + len_encKey + len_IV
4:        n_rem||n_loc||n_pq,rem||n_pq,loc ← CONFIGNONCES(nonces)
5:        (k_sig,l||k_enc,l||IV_l) ← PRF(n_rem, n_loc, len_keys)
6:        (k_sig,r||k_enc,r||IV_r) ← PRF(n_loc, n_rem, len_keys)
7:        (k_sig,l,pq||k_enc,l,pq||IV_l,pq) ← PRF(n_pq,rem, n_pq,loc, len_keys)
8:        (k_sig,r,pq||k_enc,r,pq||IV_r,pq) ← PRF(n_pq,loc, n_pq,rem, len_keys)
9:        k_sig,local ← k_sig,l ⊕ k_sig,l,pq      → Apply XOR to temporary keys
10:       k_enc,local ← k_enc,l ⊕ k_enc,l,pq
11:       IV_local ← IV_l ⊕ IV_l,pq
12:       k_sig,remote ← k_sig,r ⊕ k_sig,r,pq
13:       k_enc,remote ← k_enc,r ⊕ k_enc,r,pq
14:       IV_remote ← IV_r ⊕ IV_r,pq
15:       keys ← k_sig,local||k_enc,local||IV_local||k_sig,remote||k_enc,remote||IV_remote
16:       return keys
17:   end procedure
```

Since this algorithm for symmetric key generation can be called equally both on the server side and on the client side, the indications remote and local are used here for the variables instead of an indication of client and server. That is to say, if the key generation is carried out on the server side, a variable with the indication "local" corresponds to the server-side variable, while "remote" corresponds to the client variable; if the key generation is applied in the client, the indication "local" corresponds to the client-side variable, while "remote" corresponds to the server variable.

The exemplary key generation algorithm generates, for each side (i.e., for the client and the server), two cryptographic keys each, which can subsequently be used during the secure session to encrypt and sign messages, and one initialization vector each. Below, reference is made in each case to the lines of the algorithm reproduced above. First, the desired length of all symmetric keys to be generated is defined in lines 2 and 3 or obtained from a corresponding security guideline. Since the keys can be obtained from splitting result values, both the length of the individual keys (including the initialization vector) and the total length of all keys as the sum of the individual keys are defined.

In line 4, the existing four nonces are sorted depending on their association (e.g., client/server) and their generation (conventional or quantum-secure/post-quantum). Subsequently, in lines 5 to 8, these nonces are used as input values for pseudo-random functions PRF, which extends the length of the available nonces (e.g., 32 bytes) to the desired total length of the cryptographic material, i.e., of the two keys and the initialization vector (e.g., 80 bytes).

In lines 5 and 6, the conventional (first and second) nonces are used, i.e., according to the nonces formed in steps 110 and 220, respectively. In the first call in line 5, the local nonce is used as the start value or seed and the remote nonce as a secret input value. In the second call in line 6, the two nonces are swapped.

The output value of the pseudo-random functions is divided into three parts according to the specified lengths for the keys and the initialization vector and thus, in each case, forms a local and a remote preliminary key pair with one key each for signing and encrypting messages, as well as one initialization vector.

In order to achieve a hybrid method, the pseudo-random functions must be called two additional times; lines 7 and 8 show the utilization of the quantum-secure third and fourth nonces, wherein each of the two nonces is again used once as the start value and once as the input value and the output values are again, in each case, divided into two keys and one initialization vector.

In this way, eight symmetric preliminary keys and four initialization vectors of respectively the same length can be generated, wherein the generations of the conventional and of the quantum-secure keys occur separately. A combiner is therefore now used to form the combined hybrid keys. In the example described here, an XOR-then-MAC combiner is provided. An XOR function (exclusive OR) is therefore applied to the generated keys in lines 9 to 14 so that for each key, the conventional and the quantum-secure key are combined and the final hybrid keys and initialization vectors are generated, namely a local hybrid signature key $k_{sig,local}$ (line 9), a local hybrid encryption key $K_{enc,local}$ (line 10), a local initialization vector $IV_{local}$ (line 11), a remote hybrid signature key $K_{sig,remote}$ (line 12), a remote hybrid encryption key $K_{enc,remote}$ (line 13) and a remote initialization vector $IV_{remote}$ (line 14).

For further processing and to complete the XOR-then-MAC combiner, the application of the MAC function follows as already described for step 290. In this case, the local signature key $k_{sig,local}$ just generated in line 9 can be used as the MAC key $K_{MAC}$. The application of the MAC function protects the transmitted secret texts against modifications. If on the client side, the keys can be successfully verified using the received message authentication code MAC, they can be applied in the subsequent secure session for encrypting and signing messages.

Figure 2:
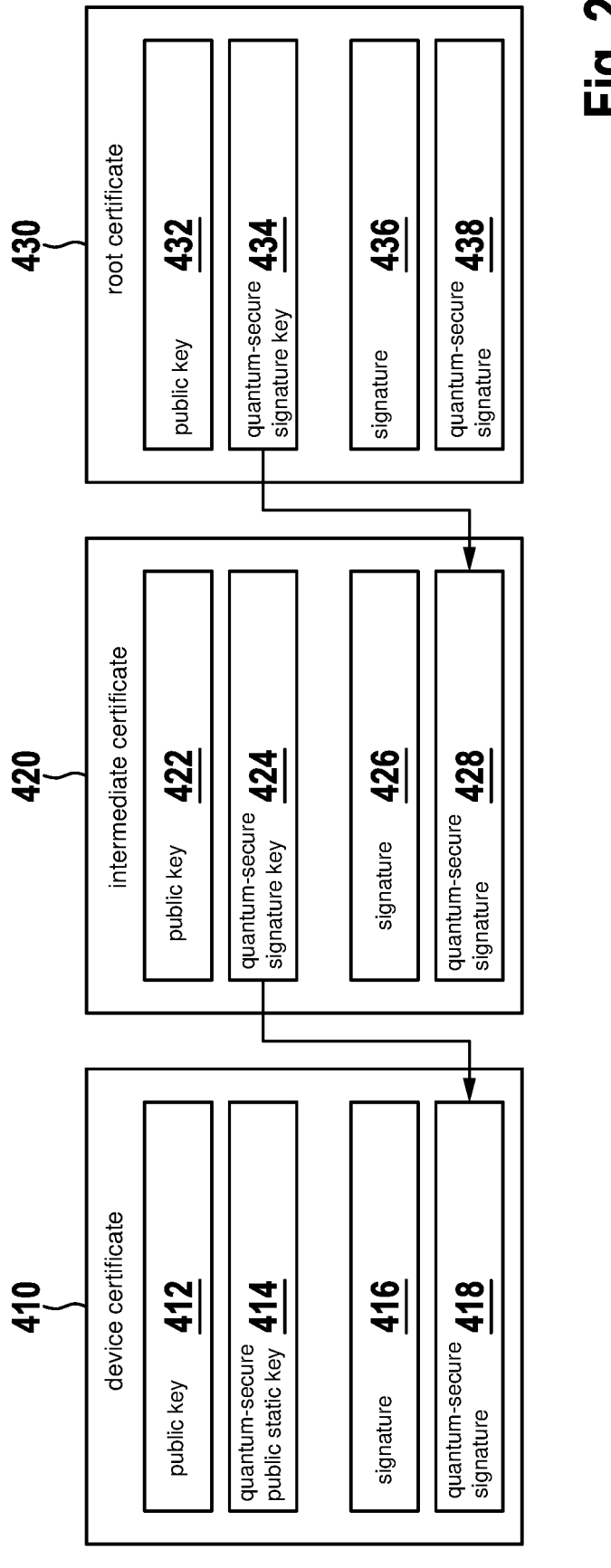
FIG. 2 shows an exemplary certificate chain with hybrid certificates, according to an example embodiment of the present invention.

FIG. 2 shows a possible hybrid certificate chain that may be used in the method presented. Both quantum-secure keys and conventional keys are provided in this case. Each certificate is signed with the public signature key of the overlying certificate. The chain shown comprises the device certificate 410, an intermediate certificate 420 and a root certificate 430. The basic functions of such certificate chains are conventional and are not further discussed here. The root certificate 430 comprises a conventional public key 432 and a quantum-secure signature key 434. In addition, the root certificate comprises a conventional signature 436 and a quantum-secure signature 438. Likewise, the intermediate certificate 420 comprises a conventional public key 422, a quantum-secure signature key 424, a conventional signature 426 and a quantum-secure signature 428. The signatures 426 and 428 are respectively created using the signature keys 432 and 434 of the root certificate.

The hybrid device certificate 410, as the client certificate and the server certificate, respectively corresponds to the certificates transmitted above in the messages 305, 310 and 320 from the client and the server and verified in steps 105 and 205. The device certificate also comprises a conventional public key 412, a conventional signature 416, and a quantum-secure signature 418 signed with the signature keys of the intermediate certificate 420. However, unlike the parent certificates, this device certificate does not contain a quantum-secure signature key. Instead, the device certificate in each case comprises the quantum-secure public static key 414 used for encapsulation in the above method steps in each case.

While the individual method steps above have been designed to fully comply with the OPC UA protocol and may thus be used as a hybrid extension of the conventional protocol messages, it is understood that non-essential method steps, such as the signature steps, could in principle also be omitted by the client and server if such a hybrid key exchange method is applied in a different environment. Likewise, nonces could be formed in a different way than shown herein, or other functions could be utilized for key generation and/or as a combiner. It is also possible to form, for example, the MAC codes on the client side and/or the server side over more than the mentioned elements. For example, a MAC code could be formed over all elements generated for the handshake up to the time of MAC generation, e.g., all generated nonces, secrets and secret texts. A MAC code thus extended would only slightly increase the computational effort and allows changes in the messages to already be detected early during the handshake.

The above examples describe a hybrid key exchange method. However, the described authentication using several key encapsulations can also be applied in a system that is based purely on quantum-secure cryptography. In this case, conventional portions, such as the signature and encryption steps and the XOR-then-MAC combiner, may be omitted. The certificates in this case may comprise purely quantum-secure content for corresponding quantum-secure methods, instead of the hybrid certificates described herein. A purely quantum-secure handshake that does not require complex quantum-secure signature schemes can thus be achieved between subscribers.

As has already been noted, the embodiments of the present invention can be used with any sufficiently quantum-secure key encapsulation mechanism KEM; examples of potential candidates include the currently developed KEM methods CRYSTALS-Kyber, NTRU and Saber, the details of which are available in the related art. Since the features added to the traditional OPC UA standard, such as the secret text and the quantum-secure keys, are each preferably inserted in the (unencrypted) header of the handshake messages, no increased computational effort is necessary for the asymmetric encryption itself, even if the message size changes.

13

What is claimed is:

1. A method, in a server, for exchanging cryptographic keys for quantum-secure communication between the server and a client, the method comprising the following steps:

receiving a request message for a secure communication channel from the client, wherein the request message includes at least one quantum-secure public ephemeral key and a first secret text, wherein the quantum-secure public ephemeral key is part of an asymmetric ephemeral key pair formed using a key generation function of a quantum-secure key encapsulation mechanism, wherein the request message forms a modified request message for an OpenSecureChannel handshake in an Open Platform Communications (OPC) Unified Architecture (UA) protocol;

decapsulating the first secret text with a decapsulation function of the quantum-secure key encapsulation mechanism using a quantum-secure secret static key of the server, wherein the decapsulation generates a first secret;

encapsulating the quantum-secure public ephemeral key with an encapsulation function of the quantum-secure key encapsulation mechanism, wherein the encapsulation generates a second secret text and a second shared secret;

encapsulating a quantum-secure public static key of the client using the encapsulation function of the quantum-secure key encapsulation mechanism, wherein the encapsulation generates a third secret text and a third shared secret;

generating hybrid symmetric keys using at least the first secret, the second secret, and the third secret; and sending a response message to the client, wherein the response message includes at least the second secret text and the third secret text, wherein the response message forms a modified response message for an OpenSecureChannel handshake in an OPC UA protocol.

2. The method according to claim 1, further comprising:

forming a message authentication code (MAC) by applying a MAC function to a predetermined content of the response message using a key from the generated hybrid symmetric keys, wherein the response message additionally includes the formed MAC code.

3. The method according to claim 1, further comprising:

obtaining a message authentication code (MAC) in the request message from the client;

forming a local MAC code over a predetermined content of the request message using the decapsulated first secret as a key; and comparing the formed local MAC code to the obtained MAC code to verify the obtained MAC code.

4. The method according to claim 1, wherein:

the request message further includes a first nonce;

the method further comprises generating a second nonce;

when generating the hybrid symmetric keys, the first nonce and the second nonce are additionally used; and the response message to the client includes the second nonce.

5. The method according to claim 4, wherein the generation of the hybrid symmetric keys includes:

generating a third nonce and a fourth nonce using the first secret, the second secret, and the third secret; and generating the hybrid symmetric keys from the first nonce, the second nonce, the third nonce, and the fourth nonce using a combiner.

14

6. The method according to claim 5, wherein the server and the client use the same quantum-secure key encapsulation mechanism and the same combiner.

7. A method, in a client, for exchanging cryptographic keys for quantum-secure communication between the client and a server, the method comprising the following steps:

forming, using a key generation function of a quantum-secure key encapsulation mechanism, an asymmetric quantum-secure ephemeral key pair with a quantum-secure public ephemeral key and a quantum-secure secret ephemeral key;

encapsulating the quantum-secure public ephemeral key using an encapsulation function of the quantum-secure key encapsulation mechanism, wherein the encapsulation generates a first secret text and a first shared secret;

sending a request message to the server, the request message including at least the quantum-secure public ephemeral key and the first secret text, wherein the request message forms a modified request message for an OpenSecureChannel handshake in an Open Platform Communications (OPC) Unified Architecture (UA) protocol;

receiving, from the server, a response message including at least a second secret text and a third secret text, wherein the response message forms a modified response message for an OpenSecureChannel handshake in an OPC UA protocol;

decapsulating the received second secret text with a decapsulation function of the quantum-secure key encapsulation mechanism using the secret quantum-secure ephemeral key, wherein the decapsulation yields a second shared secret;

decapsulating the received third secret text with a decapsulation function of the quantum-secure key encapsulation mechanism using a secret quantum-secure static key of the client, wherein the decapsulation yields a third shared secret; and generating hybrid symmetric keys using at least the first secret, the second secret and the third secret.

8. The method according to claim 7, further comprising:

forming a message authentication code (MAC) by applying a MAC function to a predetermined content of the request message using the first secret as a key;

wherein the request message to the server additionally includes the formed MAC code.

9. The method according to claim 7, further comprising:

obtaining a message authentication code (MAC) in the response message from the server;

forming a local MAC code over a predetermined content of the response message using a predetermined key from the generated hybrid symmetric keys; and comparing the formed local MAC code to the obtained MAC code to verify the obtained MAC code.

10. The method according to claim 7, wherein the method further comprises generating a first nonce, and wherein the request message to the server additionally includes the first nonce, wherein the response message from the server additionally includes a second nonce, and wherein when generating the hybrid symmetric keys, the first nonce and the second nonce are additionally used.

11. The method according to claim 7, wherein the hybrid symmetric keys are used to encrypt and/or sign messages in a subsequent secure communication session between the server and the client.

12. The method according to claim 7, wherein the request message and/or the response message is encrypted and/or signed using asymmetric key pairs, and wherein the method further comprises: (i) decrypting the request message and/or the response message, and/or (ii) verifying a signature of the request message and/or the response message.

13. The method according to claim 10 wherein the generation of the hybrid symmetric keys includes: generating a third nonce and a fourth nonce using the first secret, the second secret, and the third secret; and generating the hybrid symmetric keys from the first nonce, the second nonce, the third nonce, and the fourth nonce using a combiner.

14. The method according to claim 13, wherein the combiner is an XOR combiner.

15. The method according to claim 13, wherein the server and the client use the same quantum-secure key encapsulation mechanism and the same combiner.

16. A computing unit, in a server, configured to exchange cryptographic keys for quantum-secure communication between the server and a client, the computing unit comprising a processor configured to:

> receive a request message for a secure communication channel from the client, wherein the request message includes at least one quantum-secure public ephemeral key and a first secret text, wherein the quantum-secure public ephemeral key is part of an asymmetric ephemeral key pair formed using a key generation function of a quantum-secure key encapsulation mechanism, wherein the request message forms a modified request message for an OpenSecureChannel handshake in an Open Platform Communications (OPC) Unified Architecture (UA) protocol;
>
> decapsulate the first secret text with a decapsulation function of the quantum-secure key encapsulation mechanism using a quantum-secure secret static key of the server, wherein the decapsulation generates a first secret;
>
> encapsulate the quantum-secure public ephemeral key with an encapsulation function of the quantum-secure key encapsulation mechanism, wherein the encapsulation generates a second secret text and a second shared secret;
>
> encapsulate a quantum-secure public static key of the client using the encapsulation function of the quantum-secure key encapsulation mechanism, wherein the encapsulation generates a third secret text and a third shared secret;
>
> generate hybrid symmetric keys using at least the first secret, the second secret, and the third secret; and > send a response message to the client, wherein the response message includes at least the second secret text and the third secret text, wherein the response message forms a modified response message for an OpenSecureChannel handshake in an OPC UA protocol.

17. A non-transitory machine-readable storage medium on which is stored a computer program for exchanging cryptographic keys for quantum-secure communication between a server and a client, the computer program, when executed by a computing unit of the server, causing the computing unit to perform the following steps:

> receiving a request message for a secure communication channel from the client, wherein the request message includes at least one quantum-secure public ephemeral key and a first secret text, wherein the quantum-secure public ephemeral key is part of an asymmetric ephemeral key pair formed using a key generation function of a quantum-secure key encapsulation mechanism, wherein the request message forms a modified request message for an OpenSecureChannel handshake in an Open Platform Communications (OPC) Unified Architecture (UA) protocol;
>
> decapsulating the first secret text with a decapsulation function of the quantum-secure key encapsulation mechanism using a quantum-secure secret static key of the server, wherein the decapsulation generates a first secret;
>
> encapsulating the quantum-secure public ephemeral key with an encapsulation function of the quantum-secure key encapsulation mechanism, wherein the encapsulation generates a second secret text and a second shared secret;
>
> encapsulating a quantum-secure public static key of the client using the encapsulation function of the quantum-secure key encapsulation mechanism, wherein the encapsulation generates a third secret text and a third shared secret;
>
> generating hybrid symmetric keys using at least the first secret, the second secret, and the third secret; and
>
> sending a response message to the client, wherein the response message includes at least the second secret text and the third secret text, wherein the response message forms a modified response message for an OpenSecureChannel handshake in an OPC UA protocol.

* * * * *